United States Patent [19]

Staüble et al.

[11] 4,139,239
[45] Feb. 13, 1979

[54] BRAKE ACCELERATOR FOR A FLUID-PRESSURE BRAKE SYSTEM HAVING A BRAKE CONTROL VALVE

[75] Inventors: Georg Stäuble; Josef Hintner, both of Munich, Fed. Rep. of Germany

[73] Assignee: Knorr-Bremse GmbH, Munich, Fed. Rep. of Germany

[21] Appl. No.: 844,055

[22] Filed: Oct. 20, 1977

[30] Foreign Application Priority Data

Oct. 20, 1976 [DE] Fed. Rep. of Germany ....... 2647283
Aug. 23, 1977 [DE] Fed. Rep. of Germany ....... 2737875

[51] Int. Cl.² ............................................. B60T 17/04
[52] U.S. Cl. ........................................ 303/82; 303/37; 303/69
[58] Field of Search .................... 303/37, 39, 58, 68, 303/69, 82, 83, 81

[56] References Cited

U.S. PATENT DOCUMENTS

| | | | |
|---|---|---|---|
| 3,716,276 | 2/1973 | Wilson et al. | 303/82 |
| 3,988,044 | 10/1976 | Hill | 303/82 |
| 4,043,605 | 8/1977 | Hart | 303/81 X |

*Primary Examiner*—Stephen G. Kunin
*Attorney, Agent, or Firm*—Edmund M. Jaskiewicz

[57] ABSTRACT

A brake accelerator has a control chamber connected through a throttle orifice to a brake line. The brake system includes a control valve in which is an emergency brake piston one side of which is subjected to brake line pressure and the other side of which is subjected to pressure in the control chamber. The emergency brake piston, as a function of a pressure drop in the brake line, opens a brake line outlet valve so that air flows from the brake line through an inlet valve. The inlet valve is held by a control piston in its open position at the start of a pressure drop in the brake line and the air is flowed into a chamber to form a control pressure. The control pressure acts on the control piston to open an outlet valve for tapping or drawing off the air from the chamber and to close the inlet valve in such a manner that after a predetermined period of time when the pressure in the chamber has dropped below a predetermined value the control piston will be returned by a spring to its initial position so that a limited quantity of pressure fluid is drawn from the brake line by the accelerator.

6 Claims, 4 Drawing Figures

BRAKE ACCELERATOR FOR A FLUID-PRESSURE BRAKE SYSTEM HAVING A BRAKE CONTROL VALVE

The present invention relates to a brake accelerator which is operable sequentially upon each successive braking stage over the service application range of brake line pressure reductions and employed with a single-release brake control valve of an indirectly acting compressed air brake for railway vehicles, more particularly, to such an accelerator having an emergency brake piston one side of which is subjected to brake line pressure and the other side subjected to control chamber pressure.

The brake accelerators to which the present invention relates are employed to cyclically draw off predetermined quantities of air from the brake line. The accelerator becomes operative upon a drop in pressure in the brake line such as would occur during a service braking operation. The brake control valve includes an emergency brake piston one side of which is subjected to brake line pressure and the other side to a pressure in a control chamber which may be of the quick-action type and connected to the brake line through a throttle connection. The emergency brake piston is thus responsive to a drop in pressure of the brake line to actuate the brake accelerator.

Such brake accelerators have been used in connection with a single-release brake control valve for indirectly acting compressed air brakes of railway vehicles. Such brake accelerators have the disadvantage that a gradual build-up or accumulation of pressure in the control chamber may occur as result of some defect or failure in the system. Such a pressure accumulation may lead to an unintentional application of emergency braking. Further, variations in this control chamber pressure affect the control and operation of the brake accelerator. In addition, the use of such a reference or control chamber pressure requires a relatively expensive structure which is susceptible to failure or malfunctioning.

It is therefore the principal object of the present invention to provide a novel and improved accelerator device for a fluid pressure braking system which is operable at each stage of service braking.

It is another object of the present invention to provide such a brake accelerator which will not initiate an emergency braking action should there be any defect in the accelerator or any defect with respect to the control chamber pressure.

It is a further object of the present invention to provide such a brake accelerator wherein variations in the control chamber pressure do not affect the control of the brake accelerator so that a more stable and uniform cycle of drawing off air is obtained.

It is an additional object of the present invention to provide such a brake accelerator which is simpler in structure, less expensive to construct and more reliable in operation.

The present invention essentially comprises an emergency brake piston which as a function of a pressure drop in the brake line opens a brake line outlet valve so that air flows from the brake line through an inlet valve. The inlet valve is held by a control piston in its open position at the start of a pressure drop in the brake line and the air is flowed into a chamber to form a control pressure. The control pressure acts on the control piston to open an outlet valve for tapping or drawing off the air from the chamber and to close the inlet valve in such a manner that after a predetermined period of time when the pressure in the chamber has dropped below a predetermined value the control piston will be returned by a spring to its initial position.

According to one aspect of the present invention there is provided in a control valve an emergency brake piston one side of which is subject to brake line pressure and the other side of which is subjected to pressure in a control chamber having a throttle connection to the brake line. A second control chamber is connected by a first passage to the brake line and a normally closed first valve is provided in the first passage so as to be opened by the emergency piston in response to a pressure drop in the brake line. A normally open second valve is also provided in the first passage. A second passage connects the second control chamber to the atmosphere and a control piston is provided in the second passage so as to be operable to close the second valve and to define a third valve which closes the second passage. As pressure fluid enters the second control chamber from the brake line upon opening of the first valve when a pressure drop occurs in the brake line pressure in the control chamber will increase such that the increased pressure will act upon the control piston to open the third valve whereby air is drawn off to the atmosphere from the second control chamber and to close the second valve. A spring moves the control piston to close the third valve and to open the second valve when the pressure in the second control chamber drops below a predetermined value so that a limited quantity of pressure fluid is drawn from the brake line by the accelerator.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
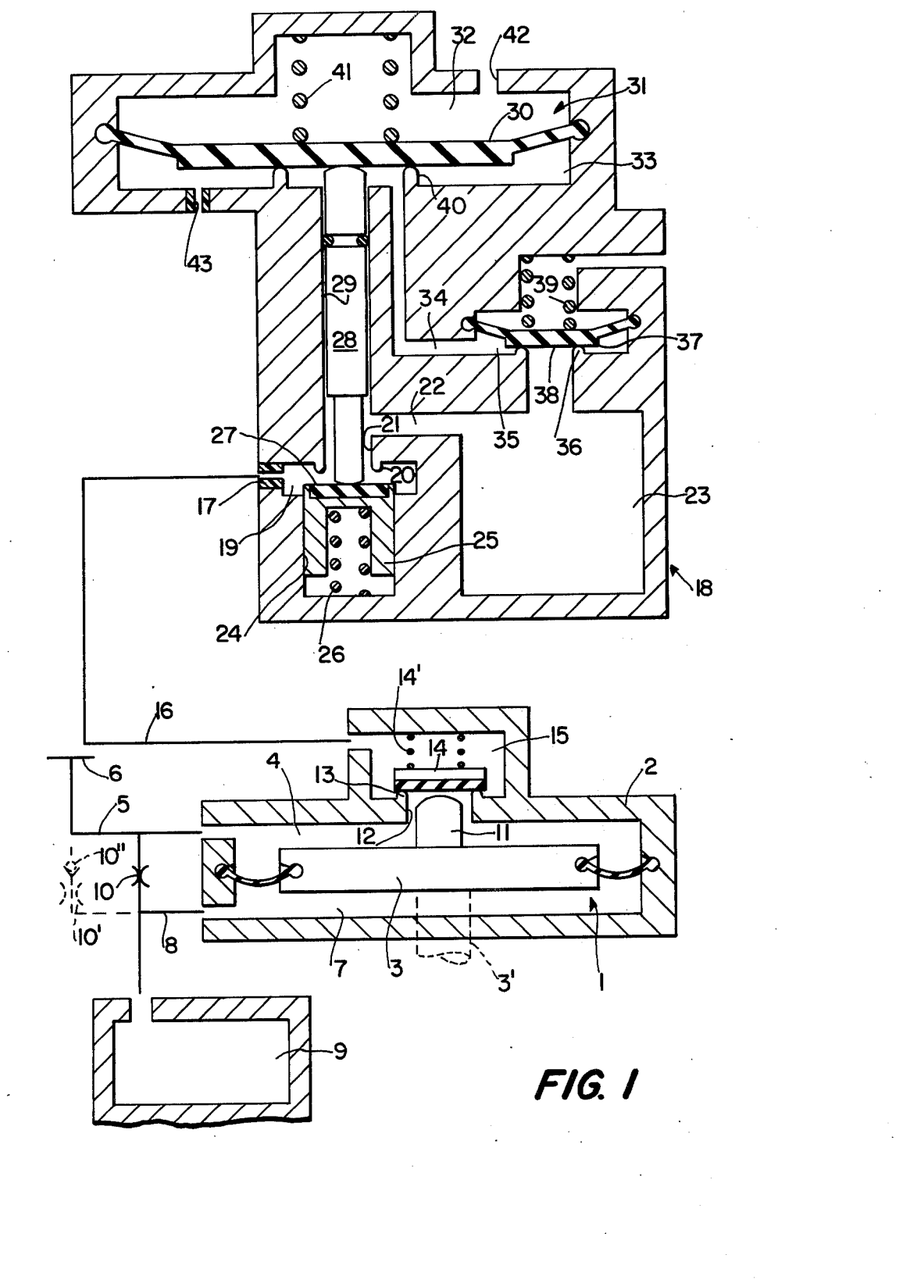
FIG. 1 is a sectional view illustrating schematically the brake accelerator according to the present invention.

As may be seen in FIG. 1, the brake accelerator has a cylindrical chamber 1 which is formed within a valve housing 2 within which is slidably positioned an emergency brake piston 3 which may be diaphragm piston as illustrated in the drawing. While a diaphragm piston is illustrated, a conventional brake piston may be employed having a piston rod 3' wherein this conventional piston has its peripheral edge sealed tight against the walls of the chamber to define pressure-tight sub-chambers 4 and 7 on both sides of the piston. The brake accelerator is used together with a known brake control valve such as disclosed in U.S. Pat. No. 3,716,276 and which is represented in FIG. 1 merely by the emergency brake piston 3 whose operation is known as described in that patent.

The upper sub-chamber 4 is connected through a pipe 5 to brake line 6 with the pressure L and the lower sub-chamber 7 communicates through a pipe 8 with a control chamber 9 having a pressure therein of $L_S$. The control chamber is connected through a throttle connection 10 to the pipe 5 leading to the brake line 6. The control chamber may be the known quick-action chamber as disclosed in the abovementioned U.S. Pat. No. 3,716,276.

The emergency brake piston 3 which in the embodiment disclosed herein comprises a diaphragm piston has a central plunger 11 extending axially from the side of the piston opening to sub-chamber 4 and projects into a central opening 12 formed in a wall of the housing defining sub-chamber 4. The plunger 11 thus freely enters the opening 12 when the piston moves in the direction of the opening. The opening 12 is provided with a valve seat 13 engageable by a plate valve member 14 the lower surface of which forms an outlet valve 13, 14 with the valve seat 13. The outlet valve 13, 14 tightly closes the opening 12 when in the position as shown in FIG. 1 and is opened upon a displacement of the emergency brake piston 3 which causes its plunger 11 to move the valve member 14 against the force of a spring 14' which is located in a recess 15.

The recess 15 is connected by a pipe 16 to an orifice or constriction 17 in a valve housing 18. The orifice 17 is disposed in a bore in the housing communicating to a chamber 19 which communicates through opening 21 and duct 22 to a control chamber 23 having a predetermined volume. A valve seat 20 is formed around the opening 21. The chamber 19 is adjacent to a cylindrical recess 24 within which is slidably and sealingly positioned a piston 25 loaded by a spring 26 in the direction of the valve seat 20. The piston 25 has an upper face or surface 27 which together with the valve seat 20 forms inlet valve 20, 27. The valve 20, 27 blocks or closes off communication between the pipe 16 and the chamber 23 when closed. A valve plunger 28 is slidably and sealingly guided in a bore 29 which opens centrally to the valve seat 20. The valve plunger 28 actuates valve 20, 27 by means of a control piston 30 which may be a diaphragm piston as shown and located in a chamber 31 so as to divide the chamber into sub-chambers 32 and 33.

The lower sub-chamber 33 is connected through a passage 34 to a chamber 35 which communicates through a valve seat 36 to the chamber 23. Chamber 35 has mounted therein a diaphragm piston 37 whose lower face 38 is engageable with the valve seat 36 to form a pressure-limiting valve 36, 38. A spring 39 acts upon the diaphragm 37 to load the valve 36, 38 in the closing direction. When valve 36, 38 is closed, the chamber 23 is blocked from passage 34 which opens into the sub-chamber 33 within a valve seat 40 formed about the bore 29. The lower surface of the control piston 30 thus defines an outlet valve 30, 40 with the valve seat 40. The bore 29 is positioned centrally within the valve seat 40 and adjacent the passage opening 34 into the chamber 33. The valve plunger 28 displaceable within the bore 29 projects into the sub-chamber 33 within the valve seat 40. A spring 41 acts upon the upper or opposite side of control piston 30 to load the control piston in the direction of valve seat 40. The spring 41 is located in the upper sub-chamber 32 which is open to the atmosphere through an opening 42 formed in a wall of the housing. The sub-chamber 33 communicates through the atmosphere through an opening 43 formed in a wall of the housing and the opening 43 may be in the form of a constriction or orifice.

In the illustrated closed position, outlet valve 30, 40 is pressed by spring 41 against valve seat 40 to shut off passage 34 and chamber 23 from the atmosphere. The valve plunger 28 is pressed downwardly by the control piston 30 in the closed position of outlet valve 30, 40 so that the inlet valve 20, 27 is moved into its opened position against the force of spring 26.

The valve housing 2 containing the emergency brake piston 3 and outlet valve 13, 14 and associated with the brake control valve which is not shown but known in the art, may be connected to the valve housing 18 or constructed to form a unit therewith. The valve housing 2 and 18 may also be separated with respect to each other and connected by the pipe 16.

In the operation of the brake accelerator of FIG. 1, a pressure equilibrium will be established in sub-chambers 4 and 7 of chamber 1 when the brakes of the vehicle are in the released position. Thus, the pressure L in brake line 6 and line 5 in sub-chamber 4 is equal to a pressure $L_S$ in the control chamber 9 and sub-chamber 7. The piston 3 will be in its midposition as illustrated, the outlet valve 13, 14 is closed and the brake accelerator device is inoperative.

When a service braking action is initiated, a predetermined decrease of pressure per unit time occurs in the brake line 6 which decrease is controlled in a known manner from the operator's brake valve. The pressure drop in the brake line does not exceed a certain predetermined value since if this value were exceeded a rapid braking action would occur in a known manner by means of the emergency brake piston. In order that the emergency brake piston remains in its service braking position during a service braking operation and is not displaced into its emergency braking position, the decrease of L pressure introduced into the brake line by the operator's brake valve must be accompanied by a corresponding decrease of pressure $L_S$ in the control chamber 9.

According to the present invention, one structure for a corresponding decrease of pressure $L_S$ comprises tapping of the pressure fluid or air from the control chamber 9 by the piston rod 3' which piston rod is indicated in dashed lines. When the flow of air through the orifice 10 is no longer sufficient for equalizing the pressures L and $L_S$, the emergency brake piston 3 will be displaced under the higher $L_S$ pressure into a position wherein its piston rod 3' will uncover or open an opening, not shown, to the control chamber 9 so that air can flow from the control chamber through a passage connected to the opening and leading to the atmosphere. In the passage there is provided an orifice whose cross-sectional area determines the emergency brake function of the emergency brake piston. When it is desired to initiate a rapid braking action and the pressure decrease in the brake line per unit time reaches a predetermined value, the equalization of the pressures L and $L_S$ by means of orifice 10 and the additional orifice opened by the piston rod 3' can no longer occur with sufficient speed. There will then occur an accumulation of $L_S$-pressure which will displace the piston 3 into the emergency brake position in which the brake accelerator is inoperative since the pressure in brake line 6 approaches zero.

A second structure for the tapping of $L_S$-air is illustrated in FIG. 1 in dashed lines wherein there is provided an orifice 10' and a check valve 10" connected between the pipes 5 and 8 and in parallel with the orifice 10. This structure is such that air can flow only from control chamber 9 through orifice 10' into the brake lines 5 and 6 but can not flow in the reverse direction. The cross-sectional area of the orifice 10' thus determines in this sense the emergency braking function of the emergency brake piston 3.

Figure 2:
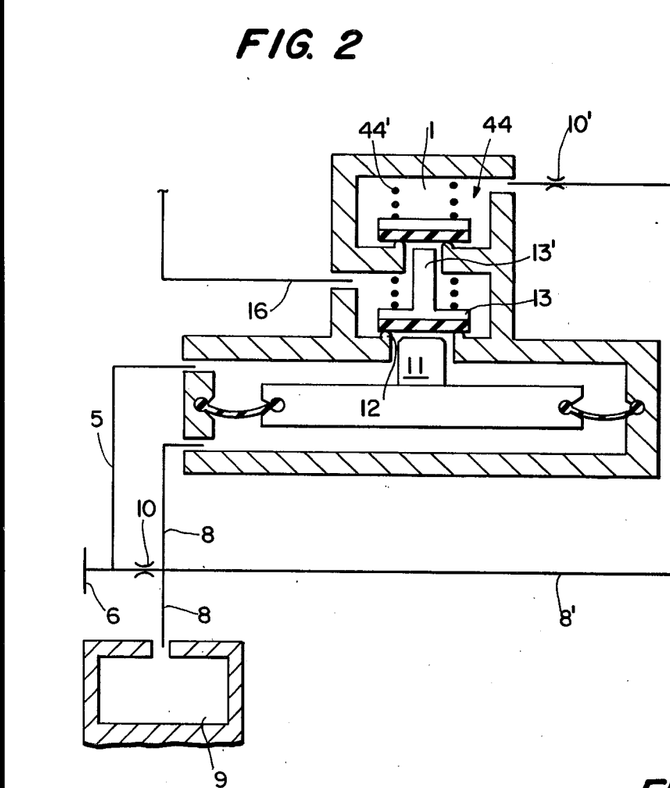
FIG. 2 is a sectional view showing schematically a valve for use with the brake accelerator of FIG. 1 for additional tapping of the reference or control chamber pressure.

A third structure for the tapping of $L_S$-air is illustrated in FIG. 2 in which there is shown a valve arrangement wherein emergency brake piston 3 with plunger 11 controls operation of outlet valve 12, 13 as described above in FIG. 1. The outlet valve 12, 13 in its open position connects brake lines 5, 6 to the pipe 16 for the purpose of actuating or rendering operative the brake accelerator. The outlet valve 12, 13 of FIG. 2 differs from the corresponding outlet valve of FIG. 1 in that a further plunger 13' is located centrally on valve member 13 and extends axially to be engageable with a valve 44 which in its open position connects the pipe 8 to the brake line 5, 6 through a branch pipe 8' having an orifice 10' therein. The cross-sectional area of the orifice 10' also determines in this embodiment the above-described emergency brake function of the emergency brake piston 3.

When the piston 3 opens valve 12, 13 during a service braking operation and the decrease of pressure in the brake line per unit time increases, the piston 3 will be displaced under the force of the increased $L_S$-pressure into a position wherein plunger 13' will open valve 44 against the force of a spring 44' in order to connect the control chamber 9 to brake line 6 through the throttling orifice 10'.

Continuing with the description of the operation of the brake accelerator of FIG. 1 it is to be borne in mind that during service braking the same pressure drop must be maintained throughout the entire length of the train and on every vehicle making up the train. To maintain this pressure drop equal to the drop in the brake line as introduced by the operator's brake valve and in order to avoid any flattening or variations in the pressure drop from vehicle to vehicle because of friction losses in the brake line, the brake accelerator of FIG. 1 functions to draw off a limited quantity of air from the brake line on every vehicle. The quantity of air drawn off is such as to eliminate any flattening or variation of the pressure drop between vehicles of the train but at the same time is not so great as to initiate a rapid braking action. It is known in the art that in order to prevent effectively an initiation of rapid braking even though there is an additional tapping of air from the brake line on every vehicle or car, additional air must be tapped to a corresponding extent from the control chamber 9 so as to maintain the proper pressure ratio $L/L_S$ during a service braking operation and the emergency brake piston will not be shifted into its emergency braking position. This additional tapping of air from the control chamber is controlled according to the present invention in the brake accelerator presently to be described with respect to FIG. 3.

As pressure is decreased in the brake line 6 upon initiating a service braking operation, pressure L in sub-chamber 4 will be decreased with respect to pressure $L_S$ in sub-chamber 7. Because of the pressure difference $L_S$-L, piston 3 of FIG. 1 will be shifted upwardly so that plunger 11 opens valve 13, 14 against the force of spring 14'. Air thus flows from brake line 6 through sub-chamber 4 into the valve chamber 15, through pipe 16 and orifice 17 into the valve chamber 19 and thus through opened inlet valve 20, 27 into the chamber 23. Inlet valve 20, 27 is in its opened position because the control piston 30 under the force of spring 41 is positioned in its initial position as shown in FIG. 1 prior to a service braking operation. In this position, the inlet valve 20, 27 is pushed open by the valve plunger 28. During the filling of chamber 23 with air, the pressure-limiting valve 36, 38 will also be closed under the force of spring 39 so that communication between chamber 23 and sub-chamber 33 is blocked.

When the brake line pressure in chamber 23 has built up to a predetermined value over a predetermined period of time by the air entering through orifice 17 and valve 20, 27, the pressure limiting valve 36, 38 will be opened against the force of spring 39. This opening occurs abruptly because the full surface of piston 37 which is subjected to the action of the brake line air is substantially larger than the central portion of the piston surface located on valve seat 36. The diameter of valve seat 36 is substantially smaller than the diameter of the piston surface which can be subjected to pressure. The valve 36, 38 is maintained closed only by the spring 39 which is located in a chamber open to the atmosphere.

Almost simultaneously with the opening of pressure limiting valve 36, 38, the control piston 30 will be lifted from its illustrated initial position under the force of brake line air and against the force of spring 41. The lifting of control piston 30 will open outlet valve 30, 40 and inlet 20, 27 will be closed under the force of spring 26.

The control piston 30 also moves from its initial position into its second position with a snap-action since the central portion of the piston surface covering the valve seat 40 is substantially smaller than the entire area of the control piston 30 which can be subjected to the action of pressure fluid. The sub-chamber 32 is also open to the atmosphere so that the control piston 30 will return to its initial position solely under the force of spring 41. The returning of control piston 30 to its initial position will again close outlet valve 30, 40 and subsequently thereto inlet valve 20, 27 will be opened.

The opening 43 in space 33 communicating with the atmosphere is located outwardly of the valve seat 40. When pressure limiting valve 36, 38 is opened and outlet valve 30, 40 is also opened, brake line air will be tapped off through opening 43 until the pressure in chamber 23 is decreased to a minimum predetermined value. At this value, the pressure limiting valve 36, 38 and control piston 30 will be shifted into their closed positions and inlet valve 20, 27 will be pushed open by valve plunger 28. The parameters are so selected that the pressure limiting valve 36, 38 is closed before outlet valve 30, 40 is closed. This prevents the opening of inlet valve 20, 27 before the pressure limiting valve 36, 38 is closed. The tapping or drawing off of air from sub-chamber 33 is preferably carried out through a orifice or constriction inserted into the opening 43 and this orifice determines the tapping gradient.

After pressure limiting valve 36, 38 and outlet valve 30, 40 are closed and while inlet valve 20, 27 is open, a brake line pressure will again be build up in chamber 23 for a subsequent tapping cycle. When the predetermined pressure level is reached by this build-up of pressure within chamber 23 there will again be an opening of the pressure limiting valve 36, 38 together with an opening of outlet valve 30, 40 and the closing of inlet valve 20, 27. This tapping cycle will be repeated in a particular time sequence as long as brake line outlet valve 13, 14 is open. When the brake line outlet valve 13, 14 is closed, the brake accelerator becomes inoperative. Thus, upon a decrease in pressure in the brake line during a service braking operation, the brake accelerator will draw off additional brake line air from the brake line in a particular or predetermined cyclical sequence. During this drawing-off operation, the control piston is subjected on one hand to the action of the brake line pressure and on the other hand to the action of a spring under atmospheric pressure.

Figure 3:
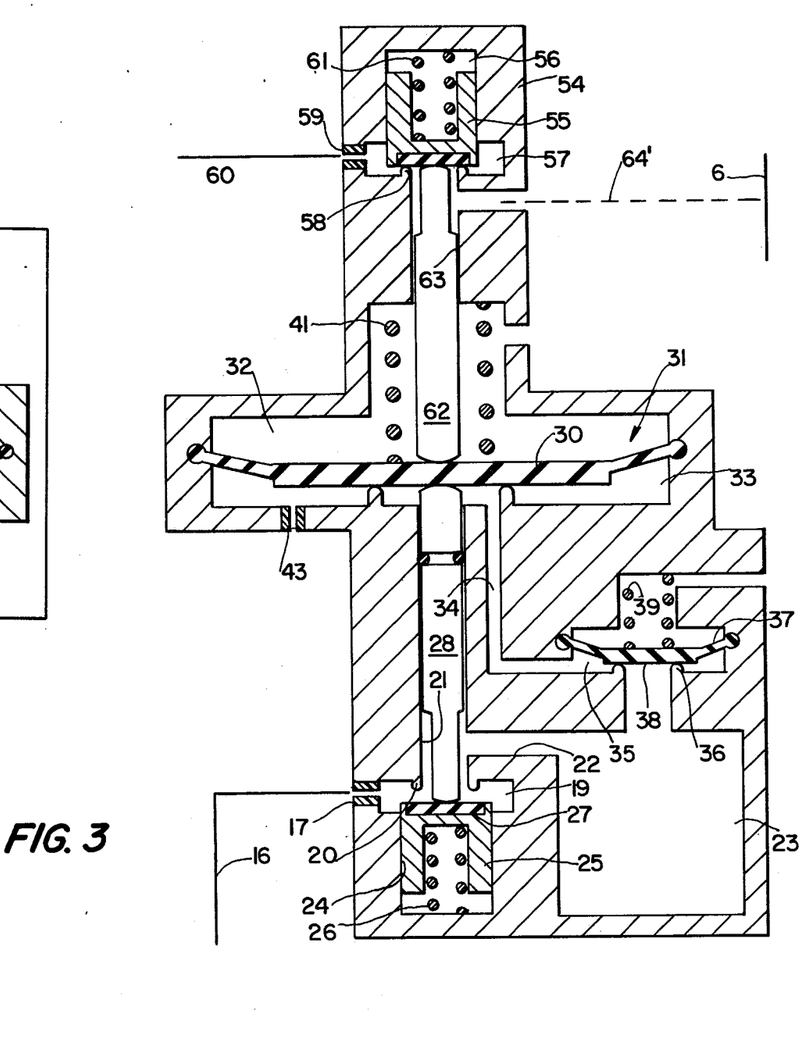
FIG. 3 is a view similar to that of FIG. 1 but showing the accelerator provided with a further valve for additional tapping of the reference pressure.

In FIG. 3 there is shown a modification of the brake accelerator of the present invention wherein the control piston actuates an additional valve by means of which corresponding quantities of air are drawn off from the control chamber in addition to the cyclic tapping of the brake line air. In all other respects the brake accelerator of FIG. 3 corresponds to the accelerator of FIG. 1 in structure and operation and for purposes of clarity the control chamber of FIG. 1 is not shown in FIG. 3.

In FIG. 3 there is shown a valve 54 which comprises a piston 55 slidably displaceable in a chamber 56 connected to a valve space 57 which communicates to the atmosphere through a valve seat 58. The valve chamber 57 is connected through an orifice 59 to a pipe 60 that branches off from the pipe 8 of FIGS. 1 and 2 but which is not illustrated ib FIG. 3.

The valve seat 58 can be closed by the piston 57 under the force of a spring 61 located in the chamber 56. Valve housing 18 of the brake accelerator is constructed as a unit with the valve housing of valve 54. The valve 54 is controlled by a valve plunger 62 which is slidably guided in a housing bore 63 and the other end of plunger 62 engages the side of control piston 30 away from the valve plunger 28.

In the open position of control piston 30, piston 55 is lifted from its valve seat 58 against the force of spring 61 so that air flowing from control chamber 9 (FIG. 1) through orifice 59 into the chamber 57 is vented to the atmosphere. The venting or tapping of the control chamber air is stopped when outlet valve 30, 40 is shifted into its closed position and piston 55 is pressed against valve seat 58 by spring 61.

The tapping of air from brake line 6 through control piston 30 and the additional tapping of air from control chamber 9 through valve 54 occurs simultaneously in the same cycle of the brake accelerator as long as the outlet valve 13, 14 (FIG. 1) is in its open position. Instead of venting the control chamber air cyclically to the atmosphere it may be advantageous under certain conditions and circumstances to deliver $L_S$ air to the brake line 6 through a pipe 64' indicated in FIG. 3.

Figure 4:
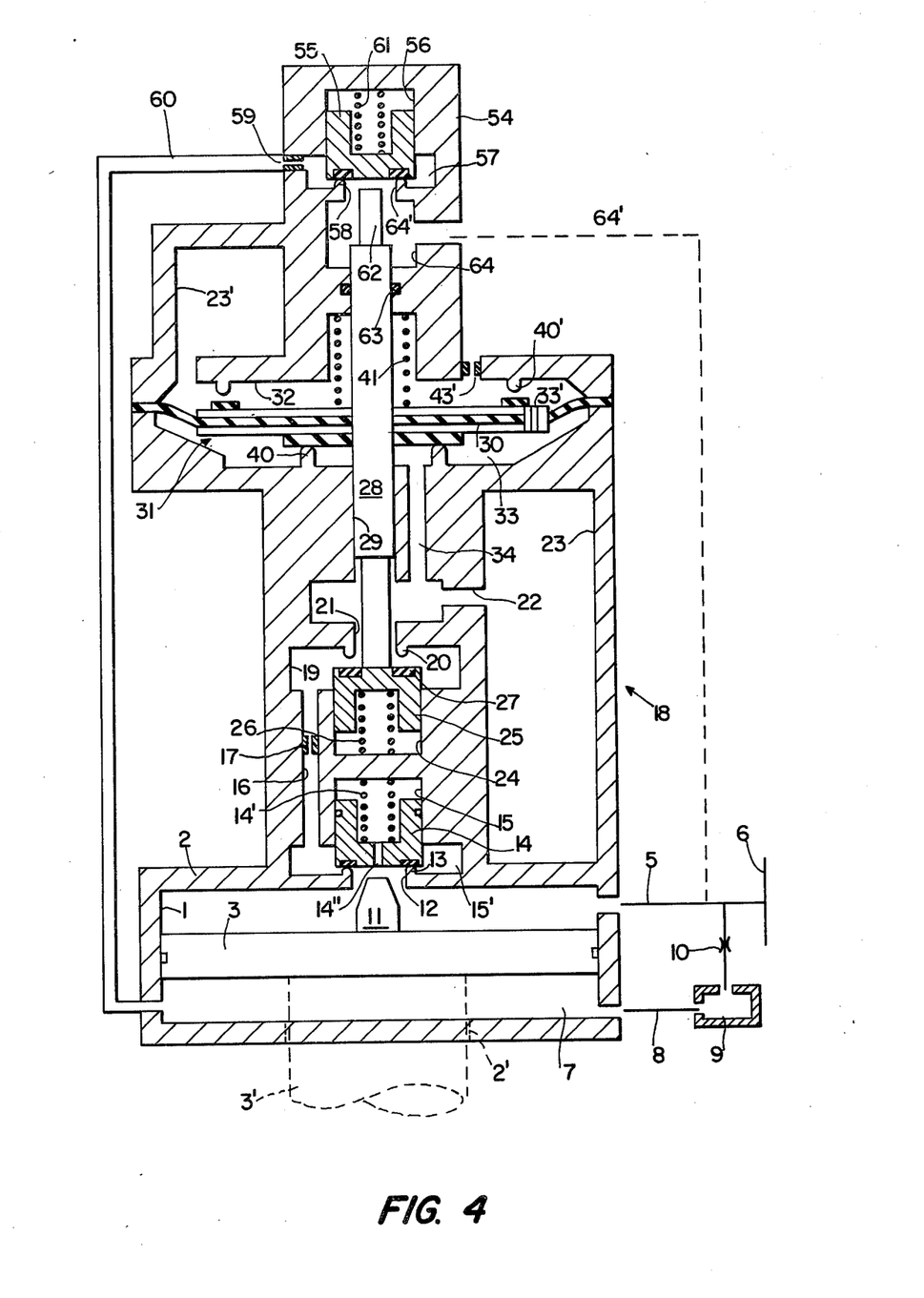
FIG. 4 is a sectional view illustrating schematically a modification of the brake accelerator of the invention.

In FIG. 4 there is illustrated a further modification of the brake accelerator of the present invention. The accelerator of FIG. 4 has a valve housing 2 in which is formed a cylindrical chamber 1 within which is slidably positioned a main piston 3 the peripheral edge of which is sealed such that the pressure-tight sub-chambers 4 and 7 are formed on both sides of the piston. Sub-chamber 4 is connected by a pipe 5 to a brake line 6 with pressure L and sub-chamber 7 is connected through a pipe 8 to a chamber 9 with pressure $L_S$ which in turn is connected to the brake line 6 through a throttle connection 10. The chamber 9 may be the known quick-action chamber of the emergency brake portion such as described above.

The side of the piston 3 opening into sub-chamber 4 is provided with a centrally located plunger 11 which extends into a central opening 12. The opening 12 is provided with a valve seat 13 engageable by a valve member 14 to form outlet valve 13, 14 which is closed when the valve member 14 is in the position as shown in FIG. 1 and which is opened upon displacement of the piston 3 such that the plunger 11 engages the valve member 14 and moves the valve member upwardly.

The valve member 14 is slidably guided in a cylindrical housing recess 15 and sealed against pressure losses. A spring 14' in the housing 15 loads the valve member 14 against valve seat 13. The valve member is provided with a bore 14" which constantly connects opening 12 and sub-chamber 4 to the housing recess 15 enclosed by the valve member 14.

The valve seat 13 projects into a valve chamber 15' from which a passage 16 leads to a further valve chamber 19 in which is formed a central opening 21 around which is positioned a valve seat 20 projecting into the valve chamber 19. The passage 16 is provided with an orifice or constriction 17. A valve member 25 in the form of a piston is slidably and sealingly guided in a cylindrical recess 24 and is loaded by a spring 26 toward valve seat 20. Valve member 25 and valve seat 20 together form valve 20, 25.

In the positions of the components as illustrated in FIG. 4, the valve member 25 is attached to the lower end of a plunger 28 which extends through opening 21 above which is formed a recess or chamber 22 connected by passage 22a to a control chamber 23 having a volume $V_1$. The recess 22 is connected by a central bore 29 to a valve chamber 31. The plunger 28 extends through recess 22 to be sliably guided in bore 29 and is securely attached to a diaphragm piston 30 positioned in the valve chamber 31 so as to divide this valve chamber into sub-chambers 32 and 33.

In the lower sub-chamber 33 a valve seat 40 surrounds the bore 29 and encloses a surface $F_{40}$ which can be closed by the lower face of the diaphragm 30 to form a valve 30, 40. A passage 34 connects the recess 22 with the space enclosed by the valve seat 40.

In the upper sub-chamber 32 there is a further valve seat 40' which is concentric with valve seat 40 and encloses a surface $F_{40'}$ which is greater in area than the surface $F_{40}$. Valve seat 40' can be closed by the upper face of diaphragm piston 30 so as to define a further valve 30, 40'. Radially outwardly of valve seat 40', the sub-chamber 32 is connected to a second control chamber 23' having a control volume $V_2$. In the portion of the housing wall enclosed by the valve seat 40' there is provided a throttle or constriction 43' which connects sub-chamber 32 to the atmosphere.

A spring 41 loads the diaphragm piston 30 toward valve seat 40. Radially outwardly of the central portion of the diaphragm surface employed for closing valve seat 40', there is provided in the piston 30 an orifice 33' through which control chamber 23' is in constant communication with the sub-chamber 33 even when valve 30, 40' is closed.

Sub-chamber 32 is provided with a central opening 63 through which the plunger 28 is slidably received and projects into a chamber 64 which is open to the atmosphere. The chamber 64 has a central opening 64' around which is formed a valve seat 58 projecting into a valve chamber 57 within a valve housing 54. The valve chamber 57 has a cylindrical recess 56 for slidably receiving a valve piston member 55 which is engageable with valve seat 58 to form a valve 55, 58. A spring 61 in the recess 56 urges the valve member 55 toward valve seat 58. The upper end 62 of the plunger 28 freely projects into the central opening 64' and upon upward displacement of diaphragm piston 30 the plunger 28 can lift valve member 55 from its valve seat 58 against the force of spring 61. The valve chamber 57 is connected with the lower piston sub-chamber 7 through an orifice 59 and a pipe 60.

The main piston 3 is movable between three distinct positions which may be described as follows:

1. In FIG. 4, the piston 3 is in a midposition which is its initial or release position in which outlet valve 13, 14 is closed and the brake line pressure L in sub-chamber 4 is equal to the chamber pressure $L_S$ in sub-chamber 7 such that $L = L_S$.
2. The service brake position in which the piston 3 is displaced upwardly into an intermediate position wherein inlet valve 20, 27 and outlet valve 13, 14 are opened. In this position, $L < L_S$ and the L-pressure drop does not fall below a predetermined value during a service braking operation.
3. The emergency brake position wherein piston 3 is moved further upwardly to its upper end position in which position the pressure relationship $L << L_S$ and the L-pressure is rapidly dropping to zero.

Operation of the Accelerator Device of FIG. 4

When the brakes of the vehicle are in the released position a pressure equilibrium exists in the piston sub-chambers 4 and 7 such that the brake line pressure L equals pressure $L_S$ in the control reservoir 9. Emergency brake piston 3 will be in its mid-position as illustrated, the valve 13, 14 is closed and the brake accelerator device is inoperative.

Upon initiating a service braking action, a predetermined decrease of pressure per unit time occurs in brake line 6 which decrease is controlled in a known manner from the operator's brake valve. The pressure drop in the brake line does not exceed a certain predetermined value since if this value were exceeded, a rapid braking action would occur in a known manner by means of the emergency brake piston. Thus, during service braking $L_S$-air must be drawn from the control chamber 9 in order to maintain the $L/L_S$-pressure equilibrium such that the emergency brake piston is not shifted into the emergency braking position. According to the present invention, the three possibilities or embodiments described above with respect to FIGS. 1 and 2 may also be used with the accelerator of FIG. 4 being applied to this accelerator in a corresponding manner.

Upon initiating a service braking operation, pressure is lowered in the brake line 6 and at the same time pressure L in sub-chamber 4 is lowered with respect to pressure $L_S$ in sub-chamber 7. As a result of the pressure difference $L_S$-L the piston 3 will be displaced into the service brake position wherein the plunger 11 will open the valve 13, 14 against the force of spring 14'. The air will thus pass from brake line 6 through sub-chamber 4 and open valve 13, 14 into valve chamber 15' and through passage 16 having the constriction 17 and then into the valve chamber 19. At the beginning of a service braking operation, the diaphragm piston 30 is pressed by spring 41 against valve seat 40 and the plunger 28 on the diaphragm piston 30 is in its lower-most position wherein valve 20, 27 is maintained by the plunger in its open position against the force of spring 26. Consequently, the air passes from valve chamber 19 through opening 20 into chamber 22 and subsequently through passage 34 under the closed valve seat 40. When the pressure in control chamber 23 is increased to a sufficient value $P_{23}$, the surface of diaphragm piston 30 enclosed by the valve seat 40 will be urged away from valve seat 40 against the force of spring 41. The pressure from chamber 23 acts suddenly on the entire lower surface of the diaphragm piston 30 and as a result the piston snaps into its upper-most position in which the piston 30 is seated upon valve seat 40'.

The upward movement of diaphragm piston 30 also carries the plunger 28 upwardly such that the inlet valve 20, 27 is closed under the force of spring 26. The closing of valve 20, 27 blocks any further increase of pressure in control chamber 23 and the air in chamber 23 flows through duct 34, open valve 30, 40 into the sub-chamber 33 and through orifice 33' into the control chamber 23'. The space defined by the diaphragm piston 30 seated upon valve seat 40' remains vented to the atmosphere through orifice 43'. Only the annular surface of the diaphragm piston 30 outwardly of valve seat 40' is subjected to the action of pressure from control chamber 23. However, when the pressure in control chamber 23' increases to a value $P_{23'}$, the diaphragm piston 30 assisted by the force of spring 41 is separated from valve seat 40' and the pressure from control chamber 23' acts upon the entire upper surface of the diaphragm piston 30. As result, the piston 30 is suddenly snapped back into its lower starting position in which the valve seat 40 is again closed.

The closing of valve 30, 40 again blocks the communication between control chambers 23 and 23' through the orifice 33' and control chamber 23' will be vented through orifice 43' to the atmosphere together with the sub-chamber 32. The movement of the diaphragm piston 30 into its lower position also displaces the plunger 28 downwardly which opens valve 20, 27 against the force of spring 26.

The above-described sequence of operations for tapping or drawing off a quantity of air from sub-chamber 4 until pressure $P_{23}$ is reached, subsequently switching the diaphragm piston 30, then venting chamber 23 through orifice 33' until the pressure is increased to $P_{23}$ and then venting control chamber 23' through orifice 43' released by diaphragm piston 32 is repeated cyclically as long as the piston 3 is in the service brake position in which position the valve 13, 14 is maintained in the open position by the plunger 11.

As discussed above, the emergency brake piston produces a rapid emergency braking action only when the operator's brake valve introduces such a decrease of pressure per unit time in the brake line that the pressure drop in the brake line falls below a certain predetermined value. The emergency brake piston which is subjected on one side to brake line pressure L from brake line 6 and on the other side to control chamber pressure $L_S$ is shifted from its service braking position into the emergency braking position only when the decrease of pressure L per unit time as controlled by the operator's brake valve is greater than the decrease of pressure $L_S$ per unit time as controlled in parallel by the emergency brake piston through an orifice. As result, a pressure difference $L_S$-L is established on the emergency brake piston which causes the piston to be displaced into its emergency braking position. The emergency brake piston is thus displaced into its emergency braking position to initiate a rapid braking action only when the decrease of pressure $L_S$ per unit time in chamber 9 occurring simultaneously with the decrease of pressure L in brake line 6 does not correspond to or is lower than the decrease pressure L per unit time in brake line 6.

In order to avoid any modification of the pressure relationship $L/L_s$ on the emergency brake piston during a service braking operation wherein air from brake line 6 is cyclically tapped through orifice 43' in the accelerator device, the accelerator device according to the present invention draws off cyclically a corresponding quantity of air from chamber 9 in addition to and during each quantity of air drawn from the brake line 6 through orifice 59. This additional cyclical tapping is accomplished by using the valve 54 having orifice 59 connected to pipe 60 which interconnects the sub-chamber 7 and the valve chamber 57.

When the diaphragm piston 30 is in its upper or service position, in which valves 20, 27 and 30, 40' are closed, the plunger 28 is also in its upper position wherein its upper end 62 opens valve 55, 58 against the force of spring 61. The air from sub-chamber 7 under the piston 3 will then escape into the atmosphere through pipe 60, throttle opening 59, open valve 55, 58 and chamber 64 until the diaphragm piston 30 is switched back to its lower position under the action of pressure $P_{23'}$ in the control chamber 23'. The downward displacement of piston 30 will also move the plunger 28 downwardly whereupon the valve 55, 58 will again be closed under the force of spring 61.

Thus, quantities of air are tapped from chamber 9 anticyclically to the tapping of air from brake line 6 through orifice 43 such that the pressure ratio $L/L_s$ acting on the emergency brake piston 3 is not varied by the additional lowering of pressure in the brake line 6 as brought about by the brake accelerator of the invention during a service braking operation.

The frequency and the quantity of air drawn off from brake line 6 and chamber 9 are determined by the sizes of the throttle openings 17, 33', 43' and 59, by the volumes of the control chambers 23 and 23', by the areas enclosed by the valve seats 40 and 40' and by the forces of the springs 26 and 41 acting upon the diaphragm piston 30. Throttle opening 17 thus determines the time necessary for establishing control pressure $P_{23}$ in control chamber 23 which permits the diaphragm piston 30 to be switched from its lower position into its upper position against the force of spring 41. Upon the switching into the upper position, the orifice 33' determines the time required to establish control pressure $P_{23'}$ in control chamber 23' which then brings about the switching of the control piston 30 into its lower or starting position assisted by the force of spring 41.

A definite quantity of air is withdrawn from brake line 6 through orifice 43' and a definite quantity of air is withdrawn from chamber 9 through the throttle opening 59.

The cyclic withdrawing of air from brake line 6 and control reservoir 9 in relatively small quantities carried out by the accelerator device can occur at a relatively high frequency of, e.g., 1 Hz. This cyclic tapping or withdrawing of air will continue as long as the main piston 3 is located in the service braking position.

It should be borne in mind that a cyclic tapping or withdrawing of air as described above at a relatively high frequency will produce an almost identical average decrease of pressure in the brake line in every railway vehicle during each stage of service braking.

Instead of tapping off the control chamber air cyclically through chamber 64 to the atmosphere, it may be advantageous in accordance with the disclosure of FIG. 3 to discharge the $L_s$-air into the brake line 6 through a pipe 64' indicated by a dashed line in FIG. 4.

Thus it can be seen that the present invention has disclosed a brake accelerator of the type as described above which is effective at each introduced stage of service braking and which will not initiate a rapid braking action in the event of any defect, malfunction or failure in the structure relating to pressure $L_s$. In addition, variations in the pressure $L_s$ will not affect the operation of the brake accelerator such that the accelerator has a more uniform and stable tapping cycle and is more reliable in operation.

It will be understood that this invention is susceptible to modification in order to adapt it to different usages and conditions, and accordingly, it is desired to comprehend such modifications within this invention as may fall within the scope of the appended claims.

What is claimed is:

1. A brake accelerator for a fluid-pressure brake system having a brake control valve comprising a control chamber having a first throttle connection to a brake line, an emergency brake piston in a control valve and having one side subjected to pressure in a brake line and a second side subjected to pressure in said control chamber, first passage means between the brake line and a second control chamber, a normally closed first valve in said first passage means and operable to an opened position by said emergency piston in response to a decrease in pressure in the brake line, a normally open second valve in said first passage means, second passage means between said second control chamber and the atmosphere, a control piston in said second passage means operable to close said second valve and defining a third valve normally closing said second passage means, pressure fluid entering said second control chamber from the brake line upon opening of said first valve when a decrease in pressure occurs in said brake line to increase pressure in said second control chamber such that the increased pressure acts upon said control piston to open said third valve whereby pressure fluid is drawn off to the atmosphere from said second control chamber and to close said second valve, a first spring acting upon said control piston to move said control piston to close said third valve and to open said second valve when the pressure in said second control chamber drops below a predetermined value so that a limited quantity of pressure fluid is drawn from the brake line by the accelerator, said control piston being held in a first position by said spring wherein said second valve is open and said third valve is closed and is moved into a second position wherein said first valve is closed and said third valve is open by an increase of pressure in said second control chamber, a fourth valve in said second passage between said control piston and said second control chamber, and a second spring closing said fourth valve, said fourth valve opened by a predetermined increase in pressure in said second control chamber, said fourth valve being moved by said second spring into its closed position before said control piston os moved by said first spring from its second position to its first position.

2. A brake accelerator as claimed in claim 1 and further comprising a plunger on said control piston engaging said second valve to hold said second valve open when said control piston is in its first position.

3. A brake accelerator as claimed in claim 1 wherein said control piston has one side subjected to the brake line pressure from said second control chamber and a second side subjected to the atmosphere, said first spring acting upon said second side of said control piston.

4. A brake accelerator as claimed in claim 1 and further comprising a third passage connecting said control chamber to one of the atmosphere and a brake line, and a fifth valve in said third passage and operable by said control piston to draw a limited quantity of pressure fluid from the control chamber to one of the atmosphere and the brake line.

5. A brake accelerator as claimed in claim 1 and further comprising a second throttle connection between said control chamber and a brake line in parallel with said first throttle connection, and a check valve in said second throttle connection to block the flow of pressure fluid from the brake line to said control chamber.

6. A brake accelerator as claimed in claim 1 and further comprising a sixth valve connecting said first valve to said control chamber and opened by said first valve when said first valve is opened by said emergency piston.

* * * * *